(12) United States Patent
Tsuchida et al.

(10) Patent No.: US 9,759,314 B2
(45) Date of Patent: Sep. 12, 2017

(54) HYDRAULIC CONTROL APPARATUS

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Kenichi Tsuchida, Nishio (JP); Yoshimitsu Hyodo, Nishio (JP); Yuhei Yoshioka, Anjo (JP); Nobuhiko Miyamoto, Nukata (JP); Yuichiro Kato, Anjo (JP); Toshihiko Kamiya, Toyota (JP); Akio Murasugi, Toyoto (JP); Masakazu Owatari, Nagakute (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 18 days.

(21) Appl. No.: 15/023,071

(22) PCT Filed: Sep. 25, 2014

(86) PCT No.: PCT/JP2014/075467
§ 371 (c)(1),
(2) Date: Mar. 18, 2016

(87) PCT Pub. No.: WO2015/046351
PCT Pub. Date: Apr. 2, 2015

(65) Prior Publication Data
US 2016/0230883 A1    Aug. 11, 2016

(30) Foreign Application Priority Data

Sep. 30, 2013 (JP) ................................. 2013-203859

(51) Int. Cl.
F16H 61/02 (2006.01)
F16H 61/12 (2010.01)
F16H 61/00 (2006.01)

(52) U.S. Cl.
CPC ............. *F16H 61/12* (2013.01); *F16H 61/00* (2013.01); *F16H 2061/1224* (2013.01); *F16H 2061/1264* (2013.01)

(58) Field of Classification Search
CPC ............................. F16H 61/0206; F16H 61/12
See application file for complete search history.

(56) References Cited

U.S. PATENT DOCUMENTS

| 5,409,434 A | 4/1995 | Furukawa et al. |
| 6,010,427 A | 1/2000 | Hagimoto et al. |

(Continued)

FOREIGN PATENT DOCUMENTS

| CN | 102725564 A | 10/2012 |
| JP | S60-175939 U | 11/1985 |

(Continued)

OTHER PUBLICATIONS

Jan. 6, 2015 International Search Report issued in International Patent Application No. PCT/JP2014/075467.

*Primary Examiner* — Tisha Lewis
(74) *Attorney, Agent, or Firm* — Oliff PLC

(57) ABSTRACT

A hydraulic control apparatus, wherein the first switching valve receives an input of one of the hydraulic pressure from the first electromagnetic valve device and the predetermined hydraulic pressure from the third switching valve, as a switching signal pressure, the first switching valve is switched from the first state to the second state in response to the input of the switching signal pressure, and the first switching valve is held in the second state, and the second switching valve receives an input of one of the hydraulic pressure from the first electromagnetic valve device and the (Continued)

predetermined hydraulic pressure from the third switching valve, as a holding pressure for holding the normal supply state.

5 Claims, 4 Drawing Sheets

(56) References Cited

U.S. PATENT DOCUMENTS

| | | |
|---|---|---|
| 2005/0209048 A1 | 9/2005 | Morise et al. |
| 2010/0082209 A1* | 4/2010 | Yoshioka ............ F16H 61/0206 701/62 |
| 2011/0220823 A1 | 9/2011 | Shimizu et al. |
| 2013/0233110 A1* | 9/2013 | Kinoshita ........... F16H 61/0246 74/473.11 |

FOREIGN PATENT DOCUMENTS

| | | |
|---|---|---|
| JP | H05-215228 A | 8/1993 |
| JP | H06-341523 A | 12/1994 |
| JP | H10-122362 A | 5/1998 |
| JP | 2005-265101 A | 9/2005 |
| JP | 2007-085484 A | 4/2007 |
| JP | 2007-255647 A | 10/2007 |

\* cited by examiner

FIG. 3

|   |   | C1 | C2 | B1 | B2 | B3 | F1 |
|---|---|----|----|----|----|----|----|
|   | P |    |    |    |    |    |    |
|   | REV |  |    | O  |    | O  |    |
|   | N |    |    |    |    |    |    |
| D | 1st | O |   |    |    | (O) | O |
|   | 2nd | O |   |    | O  |    |    |
|   | 3rd | O |   | O  |    |    |    |
|   | 4th | O | O |    |    |    |    |
|   | 5th |   | O | O  |    |    |    |
|   | 6th |   | O |    | O  |    |    |

※ (O): ENGAGEMENT DURING ENGINE BRAKE

HYDRAULIC CONTROL APPARATUS

BACKGROUND

The present disclosure relates to a hydraulic control apparatus for a transmission that allows selective engagement of at least one of a plurality of hydraulic pressure engaging elements to establish a plurality of shift stages and is equipped in a vehicle.

In the related art, this type of hydraulic control apparatus including first, second, third, and fourth normally closed linear solenoid valves, a clutch control valve that allows a D-range oil passage to communicate with any one of a low-speed stage oil passage and a high-speed stage oil passage, and a sequence valve that connects the first linear solenoid valve to a C1 clutch, connects the second linear solenoid valve to a C2 clutch, and the fourth linear solenoid valve to a B3 brake is known (for example, Japanese Patent Application Publication No. 2005-265101). The clutch control valve of the hydraulic control apparatus is controlled by a hydraulic pressure from the first linear solenoid valve that is supplied to an SL1 port, a hydraulic pressure from the second linear solenoid valve that is supplied to an SL2 port, a hydraulic pressure that is supplied to a port which communicates with the high-speed stage oil passage, and a spring. In addition, the sequence valve is controlled by a throttle pressure that is supplied to an SLT port, a solenoid modulator pressure that is supplied to a modulator port, a hydraulic pressure from the first or second linear solenoid valve that is supplied to an SL port, and a spring. In a case where an electrical failure occurs, the sequence valve selectively connects the D-range oil passage to one of the C1 clutch and the C2 clutch via the low-speed stage oil passage or the high-speed stage oil passage according to a state of the clutch control valve and connects the D-range oil passage to the B3 brake. In this manner, two shift stages having different transmission gear ratios from each other can be established according to the hydraulic control apparatus even when an electrical failure occurs during the drive of the vehicle.

SUMMARY

Herein, various configurations are considerable in the hydraulic control apparatus that has a so-called limp home function to continue the drive of the vehicle by establishing predetermined shift stages even in a case where an electrical failure occurs during the drive of the vehicle. However, a hydraulic pressure circuit relating to this type of limp home function is required to be configured not to impede an appropriate operation of the hydraulic control apparatus even in a case where a failure occurs in some of electromagnetic valves.

The present disclosure according to an exemplary aspect allows an appropriate operation of a hydraulic control apparatus having a limp home function even when a failure occurs in some of electromagnetic valves.

According to an exemplary aspect of the present disclosure, a hydraulic control apparatus for a transmission that allows selective engagement of at least one of a plurality of hydraulic pressure engaging elements to establish a plurality of shift stages and is equipped in a vehicle, the hydraulic control apparatus includes: a plurality of normally closed electromagnetic valve devices that output hydraulic pressures toward the respectively corresponding hydraulic pressure engaging elements; a normally open electromagnetic valve device that outputs a hydraulic pressure according to an accelerator position; a normally closed electromagnetic valve that outputs a signal pressure; a first switching valve that selectively sets a first state in which a hydraulic pressure for engagement is output from a first output port and a second state in which the hydraulic pressure for engagement is output from a second output port; a second switching valve that sets: a normal supply state in which the hydraulic pressure from a first electromagnetic valve device among the normally closed electromagnetic valve devices is supplied to a first hydraulic pressure engaging element among the hydraulic pressure engaging elements and the hydraulic pressure from a second electromagnetic valve device is supplied to a second hydraulic pressure engaging element; and a fail-safe state in which the hydraulic pressure for engagement from one of the first output port and the second output port is supplied to one of the first hydraulic pressure engaging element and the second hydraulic pressure engaging element according to a state of the first switching valve and a hydraulic pressure for engagement is supplied to a third hydraulic pressure engaging element among the hydraulic pressure engaging elements, when an all-fail state occurs, in which the hydraulic pressure is not output from all of the normally closed electromagnetic valve devices and the normally closed electromagnetic valve and the hydraulic pressure is output from the normally open electromagnetic valve device; and a third switching valve that sets: a first output state in which the output of the hydraulic pressure from the first electromagnetic valve device via the output port is allowed, when the signal pressure is not input from the normally closed electromagnetic valve; and a second output state in which an output of a predetermined hydraulic pressure via the output port is allowed, when the signal pressure is input from the normally closed electromagnetic valve, wherein the first switching valve receives an input of one of the hydraulic pressure from the first electromagnetic valve device and the predetermined hydraulic pressure from the third switching valve, as a switching signal pressure, the first switching valve is switched from the first state to the second state in response to the input of the switching signal pressure, and the first switching valve is held in the second state, and the second switching valve receives an input of one of the hydraulic pressure from the first electromagnetic valve device and the predetermined hydraulic pressure from the third switching valve, as a holding pressure for holding the normal supply state.

The first switching valve of the hydraulic control apparatus selectively sets the first state in which the hydraulic pressure for engagement is output from the first output port and a second state in which the hydraulic pressure for engagement is output from the second output port. In addition, the second switching valve sets the normal supply state in which the hydraulic pressure from the first electromagnetic valve device is supplied to the first hydraulic pressure engaging element and the hydraulic pressure from the second electromagnetic valve device is supplied to the second hydraulic pressure engaging element and sets the fail-safe state in which the hydraulic pressure for engagement from the first or second output port is supplied to the first or second hydraulic pressure engaging element according to the state of the first switching valve and a hydraulic pressure for engagement is supplied to the third hydraulic pressure engaging element when the all-fail state occurs. Moreover, the third switching valve sets the first output state in which the output of the hydraulic pressure from the first electromagnetic valve device via the output port is allowed when the signal pressure is not input from the normally closed electromagnetic valve and sets the second output state in which the output of the predetermined hydraulic pressure via the output port is allowed when the signal pressure is input from the normally closed electromagnetic valve. In addition, the first switching valve receives the input of the hydraulic pressure from the first electromagnetic valve device or the predetermined hydraulic pressure as the switching signal pressure from the third switching valve, is switched from the first state to the second state in response to the input of the switching signal pressure, and is held in the second state. The second switching valve receives the input of the hydraulic pressure from the first electromagnetic valve device or the predetermined hydraulic pressure as a holding pressure for holding the normal supply state from the third switching valve.

Thus, according to the hydraulic control apparatus, the hydraulic pressure from the first electromagnetic valve device can be supplied as the switching signal pressure from the third switching valve to the first switching valve and the second state of the first switching valve can be set and held, even when the normally closed electromagnetic valve that outputs the signal pressure toward the third switching valve fails. Moreover, according to the hydraulic control apparatus, the hydraulic pressure from the first electromagnetic valve device can be supplied as the holding pressure from the third switching valve to the second switching valve while the hydraulic pressure is output from the first electromagnetic valve device even when the normally closed electromagnetic valve that outputs the signal pressure toward the third switching valve fails. Accordingly, even when the normally closed electromagnetic valve fails while the hydraulic pressure is output from the first electromagnetic valve device, switching of the second switching valve from the normal supply state to the fail-safe state can be properly suppressed when the accelerator position increases in a state where the second switching valve sets the normal supply state to increase the hydraulic pressure from the normally open electromagnetic valve device.

In a case where the normally closed electromagnetic valve that outputs the signal pressure toward the third switching valve fails in a state where the hydraulic pressure is not output from the first electromagnetic valve device, the holding pressure is not supplied from the third switching valve to the second switching valve. In this case, the second switching valve may be switched from the normal supply state to the fail-safe state if the accelerator position increases to increase the hydraulic pressure from the normally open electromagnetic valve device. However, according to the hydraulic control apparatus, the second state of the first switching valve can be set and held while the hydraulic pressure is output from the first electromagnetic valve device. Accordingly, even if the second switching valve is switched from the normal supply state to the fail-safe state due to the hydraulic pressure from the normally open electromagnetic valve device when the normally closed electromagnetic valve fails in a state where the hydraulic pressure is not output from the first electromagnetic valve device, the hydraulic pressure for engagement from the second output port of the first switching valve can be supplied to the second hydraulic pressure engaging element via the second switching valve and the drive of the vehicle at the shift stage, which is established through simultaneous engagement between the second and third hydraulic pressure engaging elements, can be continued by supplying the hydraulic pressure for engagement from the second switching valve to the third hydraulic pressure engaging element. As a result, the hydraulic control apparatus that has the limp home function described above can be appropriately operated even in a case where a failure of the normally closed electromagnetic valve occurs.

In addition, the first hydraulic pressure engaging element may be a starting engaging element that is engaged so that the transmission establishes a starting stage when the vehicle is started. If the hydraulic pressure is output to the first electromagnetic valve device so as to engage the first hydraulic pressure engaging element, which is the starting engaging element, when the vehicle is started, the hydraulic pressure from the first electromagnetic valve device can be supplied as the switching signal pressure from the third switching valve to the first switching valve and the second state of the first switching valve can be set and held.

Moreover, the first hydraulic pressure engaging element may be engaged when a forward low-speed stage including the starting stage is established, and the second hydraulic pressure engaging element may be engaged when a forward high-speed stage on a higher-speed side than the forward low-speed stage is established. Even if the second switching valve is switched from the normal supply state to the fail-safe state due to the hydraulic pressure from the normally open electromagnetic valve device when the normally closed electromagnetic valve fails in a state where the hydraulic pressure is not output from the first electromagnetic valve device, the occurrence of a rapid downshift from the forward high-speed stage where the second hydraulic pressure engaging element is engaged to the forward low-speed stage where the first hydraulic pressure engaging element is engaged can be suppressed.

In addition, the hydraulic control apparatus may further include a regulator valve that generates a line pressure by regulating a hydraulic pressure from an oil pump. The predetermined hydraulic pressure and the hydraulic pressure for engagement that is supplied to the first hydraulic pressure engaging element, the second hydraulic pressure engaging element, and third hydraulic pressure engaging element via the second switching valve may be the line pressure or a hydraulic pressure based on the line pressure.

BRIEF DESCRIPTION OF THE DRAWINGS

FIG. 3 is an operation table that shows relationships between each shift stage of a transmission which is included in the power transmission apparatus illustrated in FIG. 1 and operation states of a clutch and a brake.

DETAILED DESCRIPTION OF EMBODIMENTS

Hereinafter, an embodiment of the present disclosure will be described with reference to the accompanying drawings.

Figure 1:
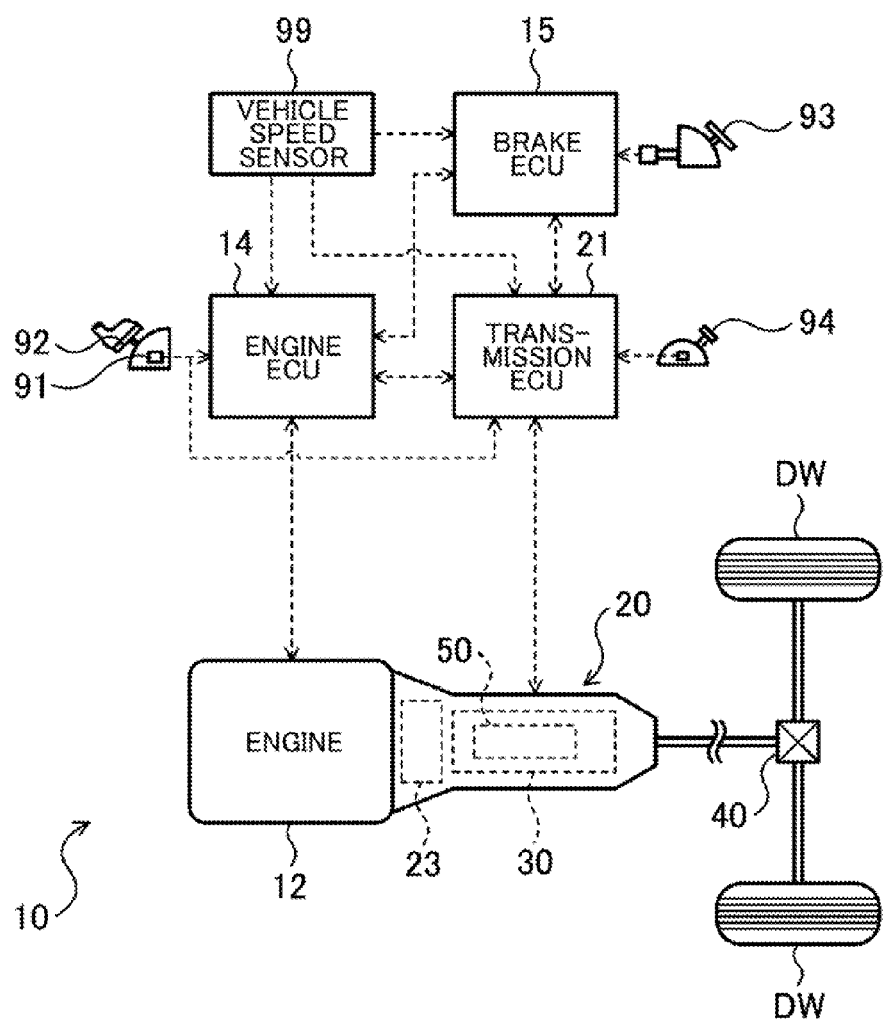
FIG. 1 is a schematic configuration diagram illustrating a vehicle that is equipped with a power transmission apparatus which includes a hydraulic control apparatus according to an embodiment of the present disclosure.

FIG. 1 is a schematic configuration diagram illustrating a car 10, which is a vehicle that is equipped with a power transmission apparatus 20 which includes a hydraulic control apparatus 50 according to an embodiment of the present disclosure. The car 10 illustrated in the drawing is configured to be a rear-wheel drive vehicle, and includes not only the power transmission apparatus 20 but also, for example, an engine 12 as a drive source that is an internal combustion engine which outputs power through explosive combustion of an air-fuel mixture in which a hydrocarbon-based fuel, such as gasoline and diesel oil, is mixed with air, an electronic control unit 14 for the engine that controls the engine 12 according to a depression amount (accelerator position Acc) of an accelerator pedal 92 which is detected by an accelerator pedal position sensor 91, a vehicle speed V which is detected by a vehicle speed sensor 99, and the like, and an electronic control unit 15 for a brake that controls an electronic control type hydraulic pressure brake unit (not illustrated) according to a depression amount of a brake pedal 93, and the like. In addition, the power transmission apparatus 20, which is connected to a crankshaft 16 of the engine 12 and transmits the power from the engine 12 to right and left driving wheels (rear wheels) DW via a differential gear 40, has a starting device 23, a stepped automatic transmission 30, a hydraulic control apparatus 50 that supplies and discharges a hydraulic oil (working fluid) to and from the starting device 23 and the stepped automatic transmission 30, an electronic control unit for transmission (hereinafter, referred to as a "transmission ECU") 21 that controls the starting device 23, the automatic transmission 30, and the hydraulic control apparatus 50, and the like.

Figure 2:
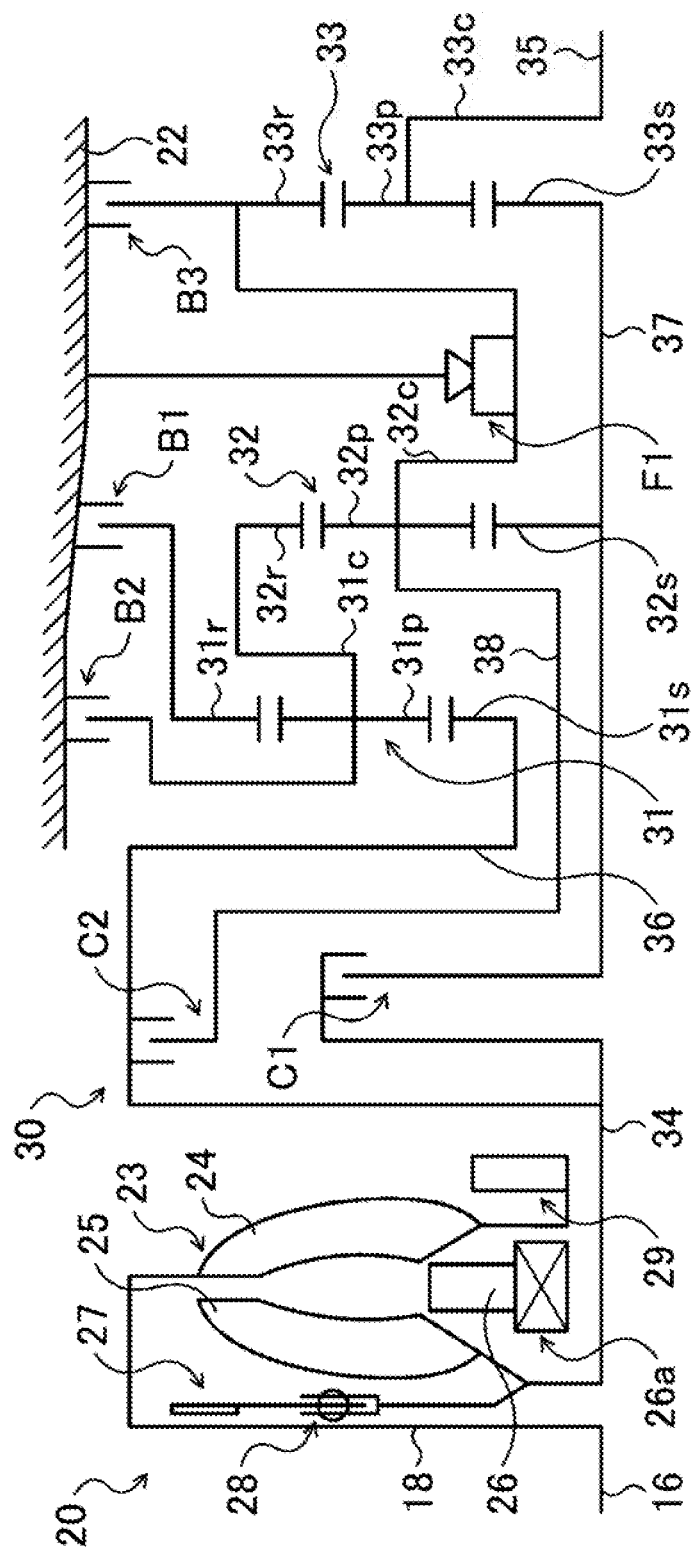
FIG. 2 is a schematic configuration diagram of the power transmission apparatus that is illustrated in FIG. 1.

As illustrated in FIG. 2, the power transmission apparatus 20 has the starting device 23, an oil pump 29 as a hydraulic pressure generation source, and a transmission case 22 that accommodates the automatic transmission 30 and the like. The starting device 23 has a torque converter that has a pump impeller 24 which is connected to the crankshaft 16 of the engine 12 via a front cover 18, a turbine runner 25 which is fixed to an input shaft 34 of the automatic transmission 30 via a turbine hub, a stator 26 which is arranged inside the pump impeller 24 and the turbine runner 25 and rectifies the flow of the hydraulic oil (ATF) from the turbine runner 25 to the pump impeller 24, a one-way clutch 26a which limits a direction of rotation of the stator 26 to one direction, and the like. Moreover, the starting device 23 has a lockup clutch 27 that connects the front cover which is connected to the crankshaft of the engine and the input shaft 34 of the automatic transmission 30 to each other and releases the connection between the front cover which is connected to the crankshaft of the engine and the input shaft 34 of the automatic transmission 30, and a damper mechanism 28 that damps a vibration between the front cover and the input shaft 34 of the automatic transmission 30. The starting device 23 may have a fluid coupling that does not have the stator 26.

The oil pump 29 as the hydraulic pressure generation source is configured to be a gear pump that has a pump assembly which has a pump body and a pump cover and an external gear which is connected to the pump impeller 24 of the starting device 23 via a hub, and is connected to the hydraulic control apparatus 50. The oil pump 29 suctions the hydraulic oil that is stored in an oil pan (hydraulic oil storage portion) via, for example, an intake oil passage (not illustrated) which is formed in the pump cover and a strainer when the external gear and an internal gear rotate, discharges the hydraulic oil with increased pressure from a discharge port (not illustrated), and supplies the hydraulic oil with increased pressure to the hydraulic control apparatus 50 via, for example, a discharge oil passage which is formed in the pump cover.

The automatic transmission 30 is configured to be a six-speed transmission. As illustrated in FIG. 2, the automatic transmission 30 has not only the input shaft 34 but also a first planetary gear mechanism 31, a second planetary gear mechanism 32, and a third planetary gear mechanism 33, each of which is a single pinion planetary gear, an output shaft 35, two clutches C1, C2 that change a power transmission path from the input shaft 34 to the output shaft 35, three brakes B1, B2, B3, and a one-way clutch F1. The first to third planetary gear mechanisms 31 to 33, the clutches C1, C2, the brakes B1 to B3, and the one-way clutch F1 are accommodated in the transmission case 22. In addition, the input shaft 34 of the automatic transmission 30 is connected to the crankshaft of the engine 12 via the starting device 23, and the output shaft 35 is connected to the driving wheels DW via the differential gear 40 (refer to FIG. 1).

The first planetary gear mechanism 31, which is arranged in the closest proximity to the engine 12 side (vehicle front), that is, to the input shaft 34 among the first to third planetary gear mechanisms 31 to 33 and constitutes a transmission gear mechanism with the second planetary gear mechanism 32 on the subsequent stage, has a first sun gear 31s that is an external gear, a first ring gear 31r as a fixable element that is an internal gear which is arranged concentrically with the first sun gear 31s, a plurality of first pinion gears 31p that are engaged with the first sun gear 31s and are engaged with the first ring gear 31r, and a first carrier 31c that rotatably supports first pinion shafts, which are rotatably inserted into the first pinion gears 31p, and holds the first pinion gears 31p to be rotatable and revolvable. The first sun gear 31s of the first planetary gear mechanism 31 is fixed to an annular connection drum 36 that is connected (spline fitting) to a clutch drum of the clutch C1 which can rotate integrally with the input shaft 34.

In addition, the second planetary gear mechanism 32 that is juxtaposed on the output shaft 35 side (vehicle rear side) of the first planetary gear mechanism 31 has a second sun gear 32s that is an external gear, a second ring gear 32r as a fixable element that is an internal gear which is arranged concentrically with the second sun gear 32s, a plurality of second pinion gears 32p that are engaged with the second sun gear 32s and are engaged with the second ring gear 32r, and a second carrier 32c that rotatably supports one ends of second pinion shafts, which are rotatably inserted into the second pinion gears 32p, and holds the second pinion gears 32p to be rotatable and revolvable. The second sun gear 32s of the second planetary gear mechanism 32 is fixed to a hollow intermediate shaft 37 that is arranged between the input shaft 34 and the output shaft 35 to be rotatable with respect to the input shaft 34 and the output shaft 35. The second ring gear 32r of the second planetary gear mechanism 32 is connected to the first carrier 31c of the first planetary gear mechanism 31. The second carrier 32c of the second planetary gear mechanism 32 is fixed to a sleeve 38 that is coaxially and rotatably supported by the intermediate shaft 37.

Moreover, the third planetary gear mechanism 33 as a reduction gear mechanism, which is arranged in the closest proximity to the output shaft 35 (vehicle rear) among the first to third planetary gear mechanisms 31 to 33, has a third sun gear 33s that is an external gear, a third ring gear 33r as a fixable element that is an internal gear which is arranged concentrically with the third sun gear 33s, and a third carrier 33c that holds a plurality of third pinion gears 33p, which are engaged with the third sun gear 33s and are engaged with the third ring gear 33r, to be rotatable and revolvable. The third sun gear 33s of the third planetary gear mechanism 33 is fixed to the intermediate shaft 37 and is connected to the second sun gear 32s of the second planetary gear mechanism 32, the third ring gear 33r of the third planetary gear mechanism 33 is connected to the second carrier 32c of the second planetary gear mechanism 32, and the third carrier 33c of the third planetary gear mechanism 33 is connected to the output shaft 35.

The clutch C1 is a multi-plate hydraulic pressure clutch that is capable of connecting the input shaft 34 and the intermediate shaft 37, that is, the second sun gear 32s of the second planetary gear mechanism 32 and the third sun gear 33s of the third planetary gear mechanism 33 to each other and releasing the connection between the input shaft 34 and the intermediate shaft 37, that is, the second sun gear 32s of the second planetary gear mechanism 32 and the third sun gear 33s of the third planetary gear mechanism 33. The clutch C2 is a multi-plate hydraulic pressure clutch that is capable of connecting the input shaft 34 and the sleeve 38, that is, the second carrier 32c of the second planetary gear mechanism 32 to each other and releasing the connection between the input shaft 34 and the sleeve 38, that is, the second carrier 32c of the second planetary gear mechanism 32. The one-way clutch F1 allows only normal rotation for the second carrier 32c of the second planetary gear mechanism 32 and the third ring gear 33r of the third planetary gear mechanism 33 and regulates reverse rotation of the second carrier 32c of the second planetary gear mechanism 32 and the third ring gear 33r of the third planetary gear mechanism 33.

The brake B1 is a multi-plate hydraulic pressure brake that is capable of fixing the first ring gear 31r of the first planetary gear mechanism 31 to be non-rotatable with respect to the transmission case 22 and releasing the first ring gear 31r to be rotatable with respect to the transmission case 22. The brake B2 is a multi-plate hydraulic pressure brake that is capable of fixing the second ring gear 32r of the second planetary gear mechanism 32 to the transmission case 22 and releasing the first carrier 31c and the second ring gear 32r to be rotatable with respect to the transmission case 22 by fixing the first carrier 31c of the first planetary gear mechanism 31 to be non-rotatable with respect to the transmission case 22. The brake B3 is a multi-plate hydraulic pressure brake that is capable of fixing the second carrier 32c of the second planetary gear mechanism 32 and the third ring gear 33r of the third planetary gear mechanism 33 to be non-rotatable with respect to the transmission case 22 and releasing the second carrier 32c and the third ring gear 33r to be rotatable with respect to the transmission case 22.

The clutches C1, C2 and the brakes B1 to B3 described above are operated in response to the supply and discharge of the hydraulic oil by the hydraulic control apparatus 50. FIG. 3 illustrates an operation table that shows relationships between each shift stage of the automatic transmission 30 and operation states of the clutches C1, C2 and the brakes B1 to B3. The automatic transmission 30 provides the shift stages of forward first speed to sixth speed and a reverse stage by putting the clutches C1, C2 and the brakes B1 to B3 into the states illustrated in the operation table of FIG. 3.

Figure 4:
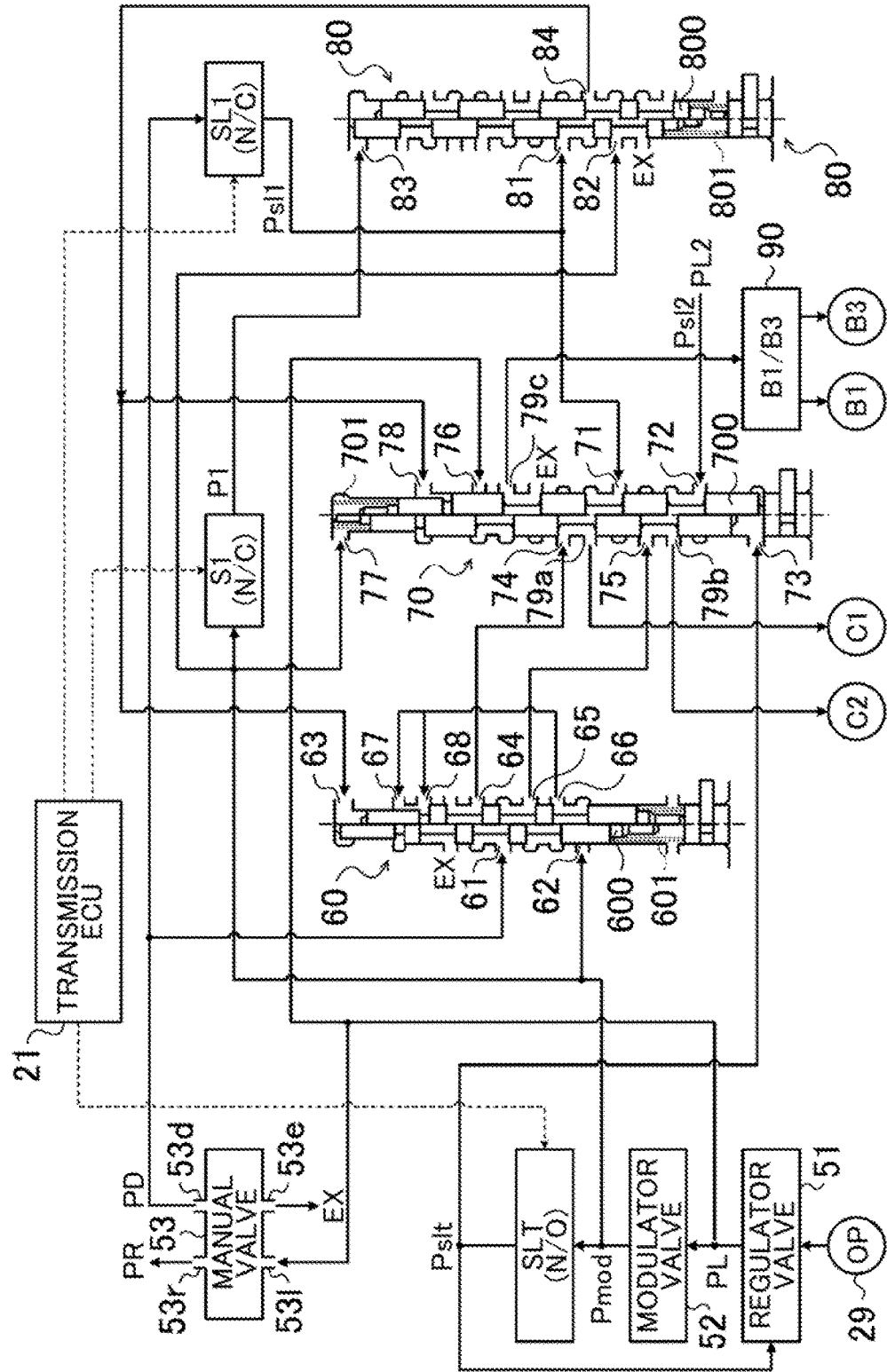
FIG. 4 is a system diagram illustrating the hydraulic control apparatus according to the present disclosure.

FIG. 4 is a system diagram illustrating the hydraulic control apparatus 50 included in the power transmission apparatus 20. The hydraulic control apparatus 50 is connected to the oil pump 29 described above, which is driven by the power from the engine 12, suctions the hydraulic oil from the oil pan, and discharges the hydraulic oil, generates hydraulic pressure which is required by the starting device 23 and the automatic transmission 30, and supplies the hydraulic oil to lubrication parts such as various types of bearings. The hydraulic control apparatus 50 has a valve body (not illustrated), a primary regulator valve 51 that regulates the hydraulic pressure (hydraulic oil) from the oil pump 29 and generates line pressure PL, a modulator valve 52 that regulates the line pressure PL which is generated by the primary regulator valve 51 and generates a substantially constant modulator pressure Pmod, and a manual valve 53 that switches a supply destination of the line pressure PL from the primary regulator valve 51 according to an operation position of a shift lever 94 (refer to FIG. 1).

In addition, the hydraulic control apparatus 50 further has a first linear solenoid valve SL1, a second linear solenoid valve SL2, a third linear solenoid valve SL3, and a fourth linear solenoid valve SL4 (only the first and second linear solenoid valves SL1, SL2 are illustrated in FIG. 4) as electromagnetic valve devices that regulate the line pressure PL as a source pressure which is generated by the primary regulator valve 51 and generate hydraulic pressure toward a corresponding clutch and the like, a linear solenoid valve (electromagnetic valve device) SLT that regulates the modulator pressure Pmod from the oil pump 29 side (modulator valve 52) and generates a hydraulic pressure Pslt according to the accelerator position Acc or an opening of a throttle valve (not illustrated), and a signal pressure output valve S1 that is an electromagnetic valve which is capable of outputting a signal pressure P1.

The primary regulator valve 51 is driven by the hydraulic pressure Pslt from the linear solenoid valve SLT. In addition, the modulator valve 52 regulates the line pressure PL from the primary regulator valve 51 with a biasing force of a spring and feedback pressure, and generates the substantially constant modulator pressure Pmod. The manual valve 53 has a spool that can be moved in an axial direction in conjunction with the shift lever 94, a line pressure input port 531, a drive range pressure output port 53d, a reverse range pressure output port 53r, and a drain port 53e, to which the line pressure PL from the primary regulator valve 51 is supplied, and the like.

When a forward drive position such as a D position and a sports position are selected as a shift position, the manual valve 53 allows the line pressure input port 531 and the drive range pressure output port 53d described above to communicate with each other, and outputs the line pressure PL from the primary regulator valve 51 from the drive range pressure output port 53d (hereinafter, the hydraulic pressure that matches with the line pressure PL which is output from the drive range pressure output port 53d will be appropriately referred to as a "drive range pressure PD"). In addition, when an R position (reverse drive position) is selected as the shift position, the manual valve 53 allows the line pressure input port 531 and the reverse range pressure output port 53r described above to communicate with each other, and outputs the line pressure PL from the primary regulator valve 51 from the reverse range pressure output port 53r. When the shift position is changed from the D position, the R position, and the like to another position, the manual valve 53 allows the drive range pressure output port 53d or the reverse range pressure output port 53r, which communicates with the line pressure input port until then, to communicate with the drain port 53; and allows the drive range pressure output port 53d or the reverse range pressure output port 53r to communicate with the drain port 53e even when the N position and the P position are selected.

The first linear solenoid valve SL1 is a normally closed linear solenoid valve that is capable of generating a hydraulic pressure Psl1 toward the clutch C1 by regulating the drive range pressure PD as a source pressure according to an electric current which is applied to a solenoid (not illustrated). The second linear solenoid valve SL2 is a normally closed linear solenoid valve that is capable of generating a hydraulic pressure Psl2 toward the clutch C2 by regulating the drive range pressure PD as a source pressure according to an electric current which is applied to a solenoid (not illustrated). The third linear solenoid valve SL3 is a normally closed linear solenoid valve that is capable of generating a hydraulic pressure Psl3 toward the brake B2 by regulating the line pressure PL as a source pressure according to an electric current which is applied to a solenoid (not illustrated). The fourth linear solenoid valve SL4 is a normally closed linear solenoid valve that is capable of generating a hydraulic pressure Psl4 toward the brake B1 by regulating the line pressure PL as a source pressure according to an electric current which is applied to a solenoid (not illustrated). In addition, in the present embodiment, a normally open linear solenoid valve is adopted as the linear solenoid valve SLT.

The signal pressure output valve S1 is a normally closed on-off solenoid valve that is capable of outputting the modulator pressure Pmod, which is input from the modulator valve 52, as the signal pressure P1. The signal pressure output valve S1 may receive an input of the hydraulic pressure (including the line pressure PL) based on the line pressure PL other than the modulator pressure Pmod as the source pressure for the signal pressure.

Each of the first to fourth linear solenoid valves SL1 to SL4, the linear solenoid valve SLT, and the signal pressure output valve S1 described above is controlled by the transmission ECU 21. In other words, the transmission ECU 21 controls a driving circuit (not illustrated) that sets hydraulic pressure command values to the first to fourth linear solenoid valves SL1 to SL4 and sets the electric currents toward the first to fourth linear solenoid valves SL1 to SL4 (solenoid portions) based on the set hydraulic pressure command values. The hydraulic pressure toward the clutches C1, C2 and the brakes B1, B2, which are friction engaging elements of the automatic transmission 30, is directly controlled (set) by the respectively corresponding first, second, third, or fourth linear solenoid valve SL1, SL2, SL3, or SL4.

In addition, the transmission ECU 21 controls a driving circuit (not illustrated) that sets a hydraulic pressure command value according to the accelerator position Ace or the opening of the throttle valve (not illustrated) and sets the electric current toward the linear solenoid valve SLT (solenoid portion) based on the set hydraulic pressure command value. Moreover, the transmission ECU 21 controls a driving circuit (not illustrated) corresponding to the signal pressure output valve S1 so that a required signal pressure is output when the signal pressure is output to the signal pressure output valve S1.

The hydraulic control apparatus 50 has not only the solenoid valves described above but also a clutch control valve (first switching valve) 60, a sequence valve (second switching valve) 70, a solenoid relay valve (third switching valve) 80, and a B1/B3 switching valve 90.

The clutch control valve 60 is a spool valve that has a spool 600 which is arranged in the valve body to be movable in the axial direction, and a spring 601 which is arranged in the valve body and biases the spool 600 upward in FIG. 4. The clutch control valve 60, as illustrated in the drawing, has a drive range pressure input port 61 that communicates with the drive range pressure output port 53*d* of the manual valve 53 via an oil passage, a modulator pressure input port 62 that communicates with an output port of the modulator valve 52 via an oil passage, a signal pressure input port 63 to which a switching signal pressure is supplied, a first output port 64, a second output port 65, a modulator pressure output port 66, and holding pressure input ports 67, 68 that respectively communicate with the modulator pressure output port 66 via oil passages.

In the present embodiment, a mounting state of the clutch control valve 60 is a first state in the left half of the drawing, in which the spool 600 is biased upward in FIG. 4 by the spring 601. In the first state (mounting state) of the clutch control valve 60, the drive range pressure input port 61 and the first output port 64 communicate with each other and the modulator pressure input port 62 is closed. In addition, when a hydraulic pressure that is equal to or higher than a predetermined value Pref is supplied to the signal pressure input port 63 of the clutch control valve 60, a biasing force of the spring 601 is surpassed by a thrust applied to the spool 600 due to the hydraulic pressure supplied to the signal pressure input port 63, and the spool 600 is moved downward in FIG. 4. In this manner, the clutch control valve 60 is placed in a state of the right half of FIG. 4, that is, a second state.

In the second state of the clutch control valve 60, the drive range pressure input port 61 and the second output port 65 communicate with each other and the modulator pressure input port 62 and the modulator pressure output port 66 communicate with each other. When the clutch control valve 60 is switched from the first state (mounting state) to the second state in this manner, the modulator pressure Pmod that is supplied to the modulator pressure input port 62 is supplied to the holding pressure input ports 67, 68 via the modulator pressure output port 66.

As illustrated in FIG. 4, the area (land outer diameter) of a pressure-receiving surface of the spool 600 that receives the modulator pressure which is supplied to the holding pressure input ports 67, 68 is determined to be larger than the area (land outer diameter) of a pressure-receiving surface of the spool 600 that receives the hydraulic pressure which is supplied to the signal pressure input port 63. Accordingly, when the clutch control valve 60 sets the second state, the holding pressure input ports 67, 68 communicate with each other, the modulator pressure Pmod that is supplied to the holding pressure input ports 67, 68 acts on the spool 600, and the thrust downward in FIG. 4, that is, in the same direction as a biasing force of a spring 801 based on the modulator pressure Pmod which is supplied to the holding pressure input ports 67, 68 is applied to the spool 600. The clutch control valve 60 of the present embodiment is configured to be held in the second state against the biasing force of the spring 601 while the thrust based on the modulator pressure Pmod which is supplied to the holding pressure input ports 67, 68 is applied to the spool 600.

The sequence valve 70 is a spool valve that has a spool 700 which is arranged in the valve body to be movable in the axial direction, and a spring 701 which is arranged in the valve body and biases the spool 700 downward in FIG. 4. The sequence valve 70, as illustrated in the drawing, has a first input port 71 to which the hydraulic pressure Psl1 from the first linear solenoid valve SL1 is supplied, a second input port 72 to which the hydraulic pressure Psl2 from the second linear solenoid valve SL2 is supplied, a third input port 73 to which the hydraulic pressure Pslt from the linear solenoid valve SLT is supplied, a fourth input port 74 that communicates with the first output port 64 of the clutch control valve 60 via an oil passage, a fifth input port 75 that communicate with the second output port 65 of the clutch control valve 60 via an oil passage, a sixth input port 76 to which the line pressure PL from the primary regulator valve 51 is supplied, a modulator pressure input port 77 that communicates with the output port of the modulator valve 52 via an oil passage, a holding pressure input port 78, a first output port 79a that communicates with an engaging oil chamber of the clutch C1, a second output port 79b that communicates with an engaging oil chamber of the clutch C2, and a third output port 79c that communicates with an input port of the B1/B3 switching valve.

In the present embodiment, a mounting state of the sequence valve 70 is a normal supply state in the right half of the drawing, in which the spool 700 is biased downward in FIG. 4 by the spring 701. In the normal supply state (mounting state) of the sequence valve 70, the first input port 71 and the first output port 79a communicate with each other, the second input port 72 and the second output port 79b communicate with each other, the third output port 79c and the drain port communicate with each other, and fourth, fifth, and sixth input ports 74, 75, 76 are closed. When the sequence valve 70 sets the normal supply state in this manner, the hydraulic pressure Psl1 from the first linear solenoid valve SL1 can be supplied to the clutch C1 and the hydraulic pressure Psl2 from the second linear solenoid valve SL2 can be supplied to the clutch C2.

In addition, in the present embodiment, the area (land outer diameter) of a pressure-receiving surface of the spool 700 that receives the hydraulic pressure Pslt from the linear solenoid valve SLT which is supplied to the third input port 73 is determined to be larger than the area (land outer diameter) of a pressure-receiving surface of the spool 700 that receives the modulator pressure Pmod which is supplied to the modulator pressure input port 77. When the hydraulic pressure Pslt from the linear solenoid valve SLT in which the modulator pressure Pmod is the source pressure increases (matches with the modulator pressure Pmod that is the source pressure) in a state where the hydraulic pressure is not supplied to the holding pressure input port 78, the sum of a thrust that is applied to the spool 700 due to the modulator pressure Pmod which is supplied to the modulator pressure input port 77 and a biasing force of the spring 701 is surpassed by a thrust that is applied to the spool 700 due to the hydraulic pressure Pslt which is supplied to the third input port 73, and the spool 700 is moved upward in FIG. 4. In this manner, the sequence valve 70 is placed in a state of the left half of FIG. 4, that is, a fail-safe state.

In the fail-safe state of the sequence valve 70, the fourth input port 74 and the first output port 79a communicate with each other, the fifth input port 75 and the second output port 79b communicate with each other, the sixth input port 76 and the third output port 79c communicate with each other, and the first and second input ports 71, 72 are closed. When the sequence valve 70 sets the fail-safe state in this manner, the drive range pressure PD (line pressure PL) as a hydraulic pressure for engagement from the first or second output port 64 or 65 of the clutch control valve 60 can be supplied to the clutch C1 or C2 and the line pressure PL as a hydraulic pressure for engagement which is supplied to the sixth input port 76 can be supplied to the B1/B3 switching valve 90 according to a state of the clutch control valve 60.

Moreover, in the present embodiment, the area (land outer diameter) of a pressure-receiving surface of the spool 700 that receives the hydraulic pressure which is supplied to the holding pressure input port 78 is determined to be equal to the area (land outer diameter) of a pressure-receiving surface of the spool 700 that receives the hydraulic pressure Pslt from the linear solenoid valve SLT which is supplied to the third input port 73. Accordingly, the sequence valve 70 can be held in the normal supply state (mounting state) if a hydraulic pressure that is equal to or higher than the hydraulic pressure Pslt is supplied to the holding pressure input port 78.

The solenoid relay valve 80 is a spool valve that has a spool 800 which is arranged in the valve body to be movable in the axial direction, and the spring 801 which is arranged in the valve body and biases the spool 800 upward in FIG. 4. The solenoid relay valve 80, as illustrated in the drawing, has a first input port 81 to which the hydraulic pressure Psl1 from the first linear solenoid valve SL1 is supplied, a second input port 82 that communicates with the output port of the modulator valve 52 via an oil passage, a signal pressure input port 83 to which the signal pressure P1 from the signal pressure output valve S1 is supplied, and an output port 84 that communicates with the signal pressure input port 63 of the clutch control valve 60 via an oil passage and communicates with the holding pressure input port 78 of the sequence valve 70 via an oil passage.

In the present embodiment, a mounting state of the solenoid relay valve 80 is a first output state in the left half of the drawing, in which the spool 800 is biased upward in FIG. 4 by the spring 801. In the first output state (mounting state) of the solenoid relay valve 80, the first input port 81 and the output port 84 communicate with each other and the second input port 82 and the drain port communicate with each other. When the solenoid relay valve 80 sets the first output state in this manner, an output of the hydraulic pressure Psl1 from the first linear solenoid valve SL1 via the output port 84 is allowed, and the hydraulic pressure Psl1 can be supplied to the signal pressure input port 63 of the clutch control valve 60 and the holding pressure input port 78 of the sequence valve 70.

In addition, when the signal pressure P1 from the signal pressure output valve S1 is supplied to the signal pressure input port 83 of the solenoid relay valve 80, a biasing force of the spring 801 is surpassed by a thrust that is applied to the spool 800 due to the hydraulic pressure which is supplied to the signal pressure input port 83, and the spool 800 can be moved downward in FIG. 4. In this manner, the solenoid relay valve 80 is placed in a state of the right half of FIG. 4, that is, a second output state. In the second output state of the solenoid relay valve 80, the second input port 82 and the output port 84 communicate with each other, and the first input port 81 is closed. Accordingly, when the solenoid relay valve 80 sets the second output state, an output of the modulator pressure Pmod (predetermined hydraulic pressure) from the modulator valve 52 via the output port 84 is allowed, and the modulator pressure Pmod can be supplied to the signal pressure input port 63 of the clutch control valve 60 and the holding pressure input port 78 of the sequence valve 70.

The B1/B3 switching valve 90 is a spool valve that has a spool (not illustrated) which is arranged in the valve body to be movable in the axial direction, and a spring (not illustrated) which is arranged in the valve body and biases the spool. The B1/B3 switching valve 90 is capable of selectively supplying the drive range pressure PD (line pressure PL) that is supplied via the sixth input port 76 and the third output port 79c of the sequence valve 70 to one of an engaging oil chamber of the brake B1 and an engaging oil chamber of the brake B3. In the present embodiment, the B1/B3 switching valve 90 can supply the drive range pressure PD (line pressure PL) that is supplied from the sequence valve 70 to the brake B1 when an all-fail state in which all of the electrically controlled valves (hereinafter, referred to as "all of the solenoid valves") such as the first to fourth linear solenoid valves SL1 to SL4, the linear solenoid valve SLT, and the signal pressure output valve S1 cannot be controlled and the hydraulic pressure cannot be output from the normally closed first to fourth linear solenoid valves SL1 to SL4 and the signal pressure output valve S1 due to power loss and the like occurs.

Next, an operation of the hydraulic control apparatus 50 that has the configuration described above will be described.

In the car 10 that is equipped with the power transmission apparatus 20 which includes the hydraulic control apparatus 50, an electric current is applied (energization) to the solenoid of the first linear solenoid valve SL1 corresponding to the clutch C1 as a starting engaging element engaged so that the automatic transmission 30 establishes the forward first speed which is a starting stage when the car 10 is started when the engine 12 is started and the forward drive position such as the D position is selected as the shift position. In addition, an electric current is not applied (energization) to the solenoid of the signal pressure output valve S1 when the car 10 is started, and the solenoid relay valve 80 sets the first output state (mounting state) described above. In this manner, the output of the hydraulic pressure Psl1 from the first linear solenoid valve SL1 via the output port 84 is allowed by the solenoid relay valve 80, and the hydraulic pressure Psl1 is supplied to the signal pressure input port 63 of the clutch control valve 60 and the holding pressure input port 78 of the sequence valve 70.

When the hydraulic pressure Psl1 becomes equal to or higher than the predetermined value Pref as a result, the clutch control valve 60 sets the second state in the right half of FIG. 4, and not only the thrust based on the hydraulic pressure Psl1 which is supplied to the signal pressure input port 63 but also the thrust downward in FIG. 4, that is, in the same direction as the biasing force of the spring 801 based on the modulator pressure Pmod which is supplied to the holding pressure input ports 67, 68 are applied to the spool 600. In this manner, the clutch control valve 60 is held in the second state. Moreover, the modulator pressure Pmod is supplied to the modulator pressure input port 77 of the sequence valve 70, and the hydraulic pressure Psl1 from the first linear solenoid valve SL1 is supplied to the holding pressure input port 78 via the solenoid relay valve 80. In this manner, the sequence valve 70 is held in the normal supply state when the car 10 is started. As a result, the hydraulic pressure Psl1 from the first linear solenoid valve SL1 can be supplied to the clutch C1 via the sequence valve 70 so that the clutch C1 can be engaged (full engagement).

In addition, in the present embodiment, the energization toward the solenoid of the signal pressure output valve S1 is initiated in the stage where the hydraulic pressure Psl1 from the first linear solenoid valve SL1 reaches the predetermined value Pref or a value slightly higher than the predetermined value Pref or in the stage where the forward second speed of the automatic transmission 30 is established and the energization toward the solenoid of the signal pressure output valve S1 continues while the forward second speed to sixth speed are established. In this manner, the solenoid relay valve 80 sets the second output state in the right half of FIG. 4 and allows the output of the modulator pressure Pmod from the modulator valve 52 via the output port 84 while the signal pressure P1 which is substantially equal to the modulator pressure Pmod from the signal pressure output valve S1 is output. In this manner, the modulator pressure Pmod is supplied to the signal pressure input port 63 of the clutch control valve 60 and the holding pressure input port 78 of the sequence valve 70 via the solenoid relay valve 80. As a result, the clutch control valve 60 is held in the second state and the sequence valve 70 is held in the normal supply state while the forward second speed to sixth speed of the automatic transmission 30 are established.

When any one of the forward first speed to sixth speed of the automatic transmission 30 is established and a failure of the signal pressure output valve S1 occurs so that the signal pressure P1 cannot be output from the signal pressure output valve S1, the solenoid relay valve 80 sets the first output state (mounting state) described above. In this manner, the output of the modulator pressure Pmod via the output port 84 of the solenoid relay valve 80 is cut off, but the output of the hydraulic pressure Psl1 from the first linear solenoid valve SL1 via the output port 84 is allowed by the solenoid relay valve 80 which sets the first output state.

In the automatic transmission 30 of the present embodiment, the clutch C1 corresponding to the first linear solenoid valve SL1 is engaged when a plurality of forward low-speed stages including the forward first speed that is the starting stage, that is, from the forward first speed to third speed are established and when the forward fourth speed among a plurality of forward high-speed stages from the forward fourth speed to sixth speed is established. As such, according to the hydraulic control apparatus 50, the hydraulic pressure Psl1 from the first linear solenoid valve SL1 can be supplied to the signal pressure input port 63 of the clutch control valve 60 and the holding pressure input port 78 of the sequence valve 70 even when a failure of the signal pressure output valve S1 occurs during the drive of the car 10 in a state where any one of the forward first speed to fourth speed of the automatic transmission 30 is established. In this manner, the clutch control valve 60 can be held in the second state, and the sequence valve 70 can be held in the withal supply state even when the hydraulic pressure Pslt from the linear solenoid valve SLT increases according to the accelerator position Ace. As a result, any one of the forward first speed to fourth speed can be established by supplying the hydraulic pressures Psl1, Psl2 from the first and second linear solenoid valves SL1, SL2 to at least one of the clutches C1, C2 via the sequence valve 70.

In contrast, in a case where a failure of the signal pressure output valve S1 occurs during the drive of the car 10 in a state where the forward fifth speed or sixth speed of the automatic transmission 30 is established, the solenoid relay valve 80 sets the first output state (mounting state) described above, but, in this case, the hydraulic pressure is not supplied to the signal pressure input port 63 of the clutch control valve 60 and the holding pressure input port 78 of the sequence valve 70 since the hydraulic pressure Psl1 is not output from the first linear solenoid valve SL1. However, the clutch control valve 60 is held in the second state as described above so that the drive range pressure input port 61 and the second output port 65 communicate with each other if the engine 12, that is, the oil pump 29 is operated and the line pressure PL and the modulator pressure Pmod are generated.

Accordingly, the drive range pressure PD (line pressure PL) from the second output port 65 of the clutch control valve 60 can be supplied to the clutch C2 and the line pressure PL that is supplied to the sixth input port 76 can be supplied to the brake B1 via the B1/B3 switching valve 90 even when the sequence valve 70 sets the fail-safe state in the left half of FIG. 4 when the hydraulic pressure cannot be supplied to the holding pressure input port 78 of the sequence valve 70 and thus the hydraulic pressure Pslt from the linear solenoid valve SLT which has the modulator pressure Pmod as the source pressure increases. In this manner, the forward fifth speed can be established through simultaneous engagement between the clutch C2 and the brake B1 (refer to FIG. 3) and the drive at the forward fifth speed can be continued without an unintended rapid downshift, that is, a downshift from the forward fifth speed or sixth speed to the forward third speed is established through the simultaneous engagement between the clutch C1 and the brake B1 occurring even when a failure of the signal pressure output valve S1 occurs during the drive of the car 10 in a state where the forward fifth speed or sixth speed of the automatic transmission 30 is established.

In addition, the solenoid relay valve 80 sets the first output state (mounting state) when the all-fail state occurs during the drive of the car 10 due to power loss and the like. Moreover, in a case where the all-fail state occurs, the hydraulic pressure Psl1 cannot be output from the first linear solenoid valve SL1, and thus the hydraulic pressure is not supplied to the signal pressure input port 63 of the clutch control valve 60 and the holding pressure input port 78 of the sequence valve 70. However, the clutch control valve 60 is held in the second state as described above so that the drive range pressure input port 61 and the second output port 65 communicate with each other if the engine 12, that is, the oil pump 29 is operated and the line pressure PL and the modulator pressure Pmod are generated.

Accordingly, the drive range pressure PD (line pressure PL) from the second output port 65 of the clutch control valve 60 can be supplied to the clutch C2 and the line pressure PL that is supplied to the sixth input port 76 can be supplied to the brake B1 via the B1/B3 switching valve 90 even when the all-fail state occurs so that the hydraulic pressure Pslt from the linear solenoid valve SLT matches with the modulator pressure Pmod and the sequence valve 70 sets the fail-safe state in the left half of FIG. 4. In this manner, the forward fifth speed can be established and the drive at the forward fifth speed can be continued even when the all-fail state occurs during the drive of the car 10 due to power loss and the like.

Moreover, when the operation of the engine 12 stops and the line pressure PL and the modulator pressure Pmod cannot be generated after the all-fail state occurs due to power loss and the like, the clutch control valve 60 sets the first state (mounting state) by using the biasing force of the spring 601. The clutch control valve 60 is held in the first state (mounting state) due to the biasing force of the spring 601 even when the engine 12 is restarted and the line pressure PL and the modulator pressure Pmod are generated. When the engine 12 is restarted in this manner, the normally open linear solenoid valve SLT outputs the hydraulic pressure Pslt that matches with the modulator pressure Pmod, and thus the sequence valve 70 sets the fail-safe state described above. In this manner, the drive range pressure PD (line pressure PL) from the manual valve 53 can be supplied to the clutch C1 via the drive range pressure input port 61 and the first output port 64 of the clutch control valve 60 and the fourth input port 74 and the first output port 79a of the sequence valve 70 and the line pressure PL that is supplied to the sixth input port 76 can be supplied from the third output port 79c to the brake B1 in a case where the operation of the engine 12 stops and is resumed after the all-fail state occurs due to power loss and the like. As a result, the car 10 can be started by establishing the forward third speed in a case where the operation of the engine 12 stops and is resumed after the all-fail state occurs due to power loss and the like.

As described above, according to the hydraulic control apparatus 50, the hydraulic pressure Psl1 from the first linear solenoid valve SL1 (first electromagnetic valve device) can be supplied as the switching signal pressure from the solenoid relay valve 80 to the clutch control valve 60 (first switching valve) and the second state of the clutch control valve 60 can be set and held even when the signal pressure output valve S1 (normally closed electromagnetic valve) which outputs the signal pressure P1 toward the solenoid relay valve 80 (third switching valve) fails. Moreover, according to the hydraulic control apparatus 50, the hydraulic pressure Psl1 from the first linear solenoid valve SL1 can be supplied as the holding pressure from the solenoid relay valve 80 to the sequence valve 70 (second switching valve) while the hydraulic pressure Psl1 is output from the first linear solenoid valve SL1 even when the signal pressure output valve S1 which outputs the signal pressure P1 toward the solenoid relay valve 80 fails. Accordingly, even when the signal pressure output valve S1 fails while the hydraulic pressure Psl1 is output from the first linear solenoid valve SL1, switching of the sequence valve 70 from the normal supply state to the fail-safe state can be properly suppressed when the accelerator position Acc increases in a state where the sequence valve 70 sets the normal supply state to increase the hydraulic pressure from the linear solenoid valve SLT.

In a case where the signal pressure output valve S1 that outputs the signal pressure P1 toward the solenoid relay valve 80 fails in a state where the hydraulic pressure Psl1 is not output from the first linear solenoid valve SL1, the holding pressure is not supplied from the solenoid relay valve 80 to the sequence valve 70. In this case, the sequence valve 70 may be switched from the normal supply state to the fail-safe state if the accelerator position Acc increases to increase the hydraulic pressure Pslt from the linear solenoid valve SLT. However, according to the hydraulic control apparatus 50, the second state of the clutch control valve 60 can be set and held while the hydraulic pressure Psl1 is output from the first linear solenoid valve SL1. Accordingly, even if the sequence valve 70 is switched from the normal supply state to the fail-safe state due to the hydraulic pressure Pslt from the linear solenoid valve SLT when the signal pressure output valve S1 fails in a state where the hydraulic pressure Psl1 is not output from the first linear solenoid valve SL1, the drive range pressure PD (hydraulic pressure for engagement) from the second output port 65 of the clutch control valve 60 can be supplied to the clutch C2 via the sequence valve 70 and the drive of the car 10 at the forward fifth speed, which is established through simultaneous engagement between the clutch C2 (second hydraulic pressure engaging element) and the brake B1 (third hydraulic pressure engaging element), can be continued by supplying the line pressure PL (hydraulic pressure for engagement) from the sequence valve 70 to the brake B1. As a result, the hydraulic control apparatus 50 that has the limp home function described above can be appropriately operated even in a case where a failure of the signal pressure output valve S1 occurs.

In addition, in the embodiment described above, the clutch C1 is a start clutch that is engaged so that the automatic transmission 30 establishes the forward first speed as the starting stage when the car 10 is started. Accordingly, if the hydraulic pressure Psl1 is output to the first linear solenoid valve SL1 so as to engage the clutch C1, which is the start clutch, when the car 10 is started, the hydraulic pressure Psl1 from the first linear solenoid valve SL1 can be supplied as the switching signal pressure from the solenoid relay valve 80 to the clutch control valve 60 and the second state of the clutch control valve 60 can be set and held.

Moreover, in the embodiment described above, the clutch C1 is engaged when the forward low-speed stage (forward first speed to third speed) including the starting stage is established, and the clutch C2 is engaged when the forward high-speed stage (forward fourth speed to sixth speed) on a higher-speed side than the forward low-speed stage is established. Accordingly, even if the sequence valve 70 is switched from the normal supply state to the fail-safe state due to the hydraulic pressure Pslt from the linear solenoid valve SLT when the signal pressure output valve S1 fails in a state where the hydraulic pressure Psl1 is not output from the first linear solenoid valve SL1, the occurrence of the rapid downshift from the forward high-speed stage (forward fifth speed or sixth speed) where the clutch C2 is engaged to the forward low-speed stage (forward third speed) where the clutch C1 is engaged can be suppressed.

The hydraulic pressure that is supplied to the second input port 82 of the solenoid relay valve 80 of the hydraulic control apparatus 50 is not limited to the modulator pressure Pmod described above, and may be the line pressure PL from the primary regulator valve 51 which regulates the hydraulic pressure from the oil pump 29 and the drive range pressure PD from the manual valve 53. In addition, the hydraulic pressure for engagement that is supplied to the drive range pressure input port 61 of the clutch control valve 60 and the fourth, fifth, and sixth input ports 74, 75, 76 of the sequence valve 70 are not limited to the line pressure PL from the primary regulator valve 51 and the drive range pressure PD from the manual valve 53, and may be a hydraulic pressure based on the line pressure PL such as the modulator pressure Pmod.

The present disclosure is not limited to the embodiment described above, and various modifications are possible without departing from the scope of the present disclosure. Moreover, the embodiment of the present disclosure is just one example of the present disclosure described in the summary of the present disclosure, and does not limit the elements of the present disclosure described in the summary of the disclosure.

INDUSTRIAL APPLICABILITY

The present disclosure can be used in the industrial field of hydraulic control apparatus manufacturing.

The invention claimed is:

1. A hydraulic control apparatus for a transmission that allows selective engagement of at least one of a plurality of hydraulic pressure engaging elements to establish a plurality of shift stages and is equipped in a vehicle, the hydraulic control apparatus comprising:
a plurality of normally closed electromagnetic valve devices that output hydraulic pressures toward the respectively corresponding hydraulic pressure engaging elements;
a normally open electromagnetic valve device that outputs a hydraulic pressure according to an accelerator position;
a normally closed electromagnetic valve that outputs a signal pressure;
a first switching valve that selectively sets a first state in which a hydraulic pressure for engagement is output from a first output port and a second state in which the hydraulic pressure for engagement is output from a second output port;
a second switching valve that sets:
a normal supply state in which the hydraulic pressure from a first electromagnetic valve device among the normally closed electromagnetic valve devices is supplied to a first hydraulic pressure engaging element among the hydraulic pressure engaging elements and the hydraulic pressure from a second electromagnetic valve device is supplied to a second hydraulic pressure engaging element; and
a fail-safe state in which the hydraulic pressure for engagement from one of the first output port and the second output port is supplied to one of the first hydraulic pressure engaging element and the second hydraulic pressure engaging element according to a state of the first switching valve and a hydraulic pressure for engagement is supplied to a third hydraulic pressure engaging element among the hydraulic pressure engaging elements, when an all-fail state occurs, in which the hydraulic pressure is not output from all of the normally closed electromagnetic valve devices and the normally closed electromagnetic valve and the hydraulic pressure is output from the normally open electromagnetic valve device; and
a third switching valve that sets:
a first output state in which the output of the hydraulic pressure from the first electromagnetic valve device via the output port is allowed, when the signal pressure is not input from the normally closed electromagnetic valve; and
a second output state in which an output of a predetermined hydraulic pressure via the output port is allowed, when the signal pressure is input from the normally closed electromagnetic valve,
wherein the first switching valve receives an input of one of the hydraulic pressure from the first electromagnetic valve device and the predetermined hydraulic pressure from the third switching valve, as a switching signal pressure, the first switching valve is switched from the first state to the second state in response to the input of the switching signal pressure, and the first switching valve is held in the second state, and
the second switching valve receives an input of one of the hydraulic pressure from the first electromagnetic valve device and the predetermined hydraulic pressure from the third switching valve, as a holding pressure for holding the normal supply state.

2. The hydraulic control apparatus according to claim 1, wherein
the first hydraulic pressure engaging element is a starting engaging element that is engaged so that the transmission establishes a starting stage when the vehicle is started.

3. The hydraulic control apparatus according to claim 2, wherein
the first hydraulic pressure engaging element is engaged when a forward low-speed stage including the starting stage is established, and
the second hydraulic pressure engaging element is engaged when a forward high-speed stage on a higher-speed side than the forward low-speed stage is established.

4. The hydraulic control apparatus according to claim 3, further comprising:
a regulator valve that generates a line pressure by regulating a hydraulic pressure from an oil pump, wherein
the predetermined hydraulic pressure and the hydraulic pressure for engagement that is supplied to the first hydraulic pressure engaging element, the second hydraulic pressure engaging element, and the third hydraulic pressure engaging element via the second switching valve are the line pressure or a hydraulic pressure based on the line pressure.

5. The hydraulic control apparatus according to claim 1, further comprising:
a regulator valve that generates a line pressure by regulating a hydraulic pressure from an oil pump, wherein
the predetermined hydraulic pressure and the hydraulic pressure for engagement that is supplied to the first hydraulic pressure engaging element, the second hydraulic pressure engaging element, and the third hydraulic pressure engaging element via the second switching valve are the line pressure or a hydraulic pressure based on the line pressure.

* * * * *